D. A. WALLACE.
TRACTION WHEEL.
APPLICATION FILED JUNE 1, 1917.
1,265,406.
Patented May 7, 1918.
2 SHEETS—SHEET 1.
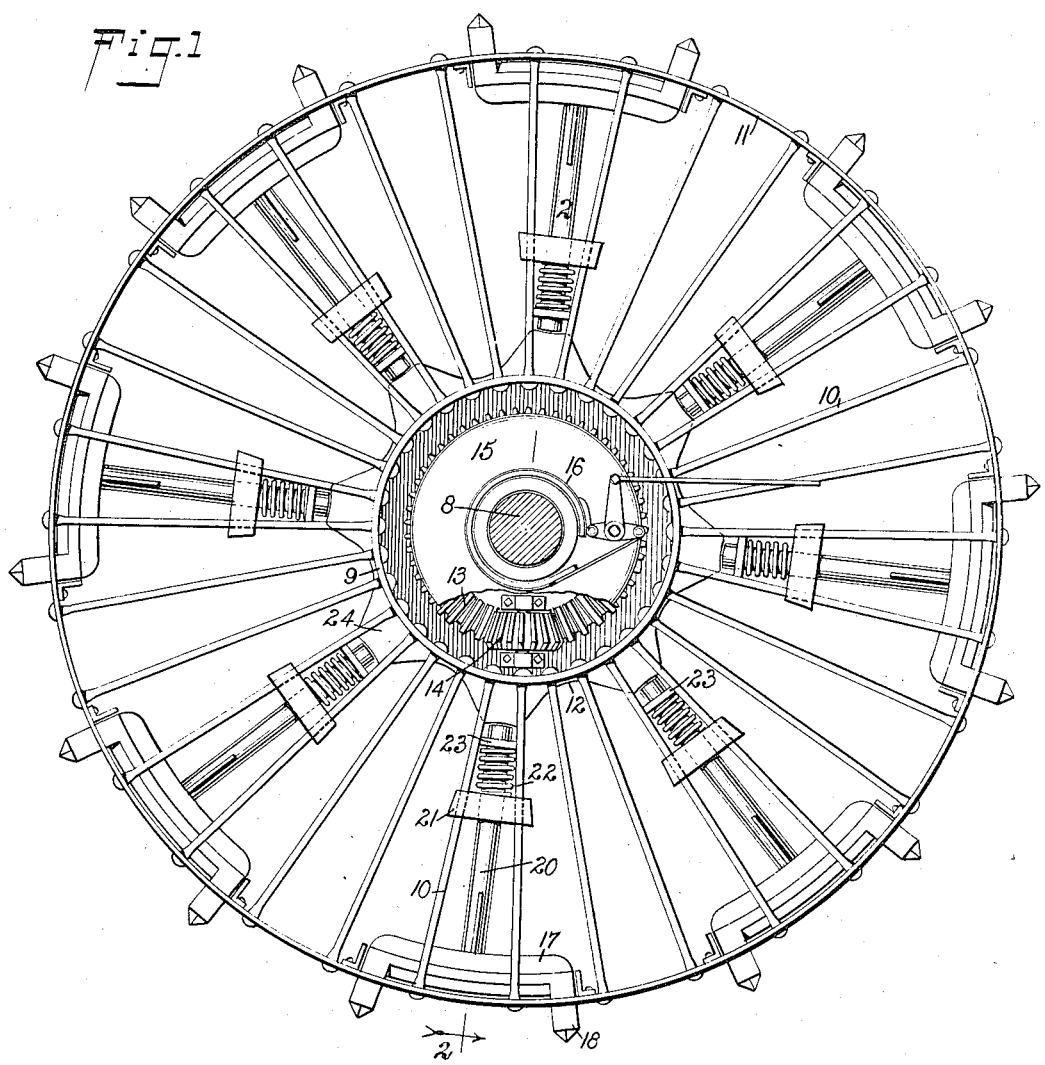
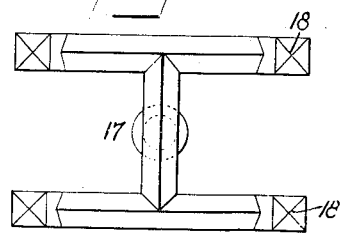
WITNESSES
INVENTOR
D.A.Wallace
BY
ATTORNEYS D. A. WALLACE.
TRACTION WHEEL.
APPLICATION FILED JUNE 1, 1917.
1,265,406.
Patented May 7, 1918.
2 SHEETS—SHEET 2.
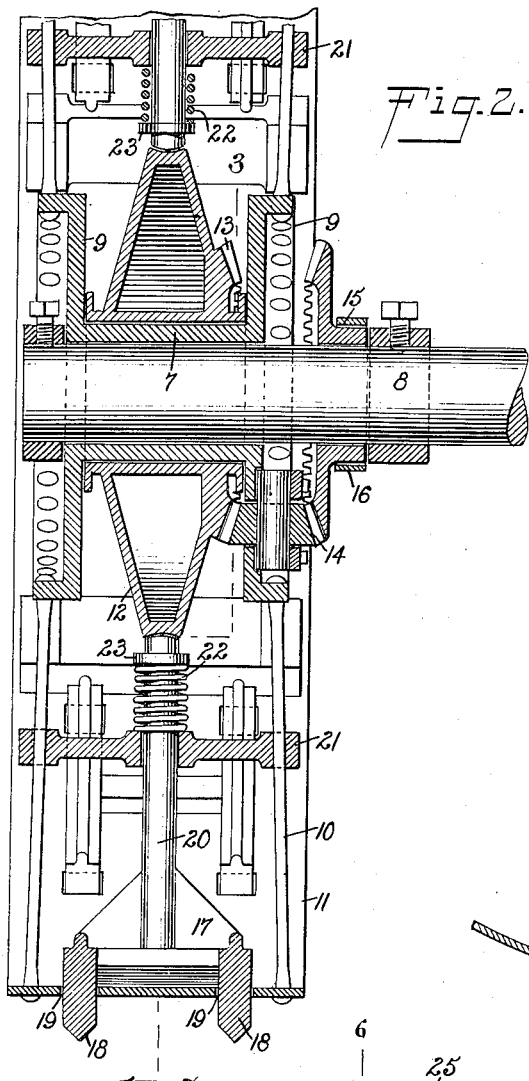
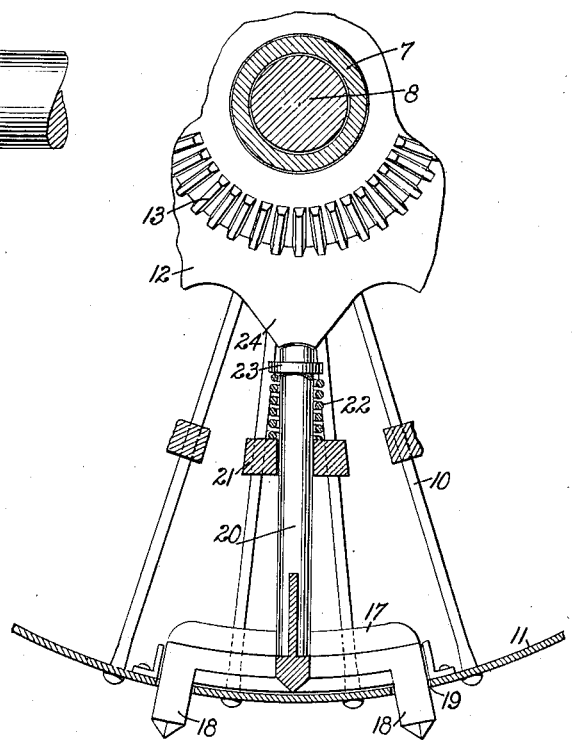
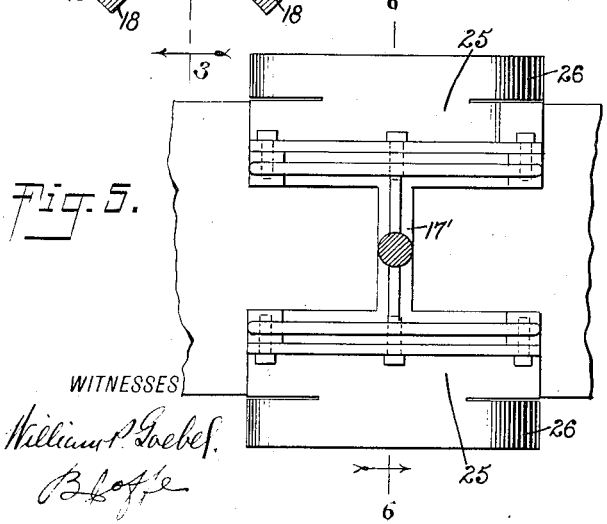
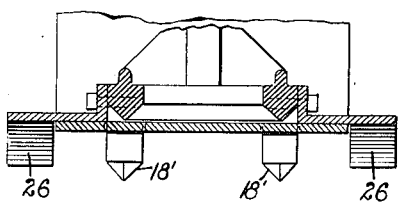
INVENTOR
D. A. Wallace
BY
ATTORNEYS

UNITED STATES PATENT OFFICE.

DAVID ALDON WALLACE, OF CHARLES CITY, IOWA.

TRACTION-WHEEL.

1,265,406.　　　　　Specification of Letters Patent.　　Patented May 7, 1918.

Application filed June 1, 1917.　Serial No. 172,183.

*To all whom it may concern:*

Be it known that I, DAVID A. WALLACE, a citizen of the United States, and a resident of Charles City, in the county of Floyd and State of Iowa, have invented a new and Improved Traction-Wheel, of which the following is a full, clear, and exact description.

My invention relates to a traction wheel, and an object thereof is to provide a simple and inexpensive traction wheel.

Another object of the invention is to provide a traction wheel having means whereby the same can be easily and quickly transformed into an ordinary wheel.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is an interior face elevation of a wheel embodying my invention;

Fig. 2 is a section on line 2—2, Fig. 1;

Fig. 3 is a section on line 3—3, Fig. 2;

Fig. 4 is a plan view on the working surface of the shoe;

Fig. 5 is a plan view of a modified shoe showing the relation of same with reference to the rim of the wheel; and Fig. 6 is a section on line 6—6, Fig. 5.

Referring to the drawings, 7 is a hub of a wheel which is mounted revolubly on an axle 8. The hub has flanges 9 at each end which are connected by spokes 10 to the rim 11 of the wheel. A star-shaped cam 12 is revolubly mounted on the hub between the flanges 9. The cam has a bevel gear 13 in mesh with a bevel pinion 14 revolubly mounted in the inner flange 9 of the hub. A bevel gear 15 revolubly mounted on the axle 8 also meshes with the pinion 14. A suitable brake mechanism 16 is provided for the bevel gear 15 whereby the rotation of same may be prevented and, consequently, a rotary movement imparted to the cam 12 when the wheel is revolved on the axle.

Shoes 17 are disposed symmetrically on the inner periphery of the rim 11. Each shoe has a plurality of studs 18 on the wearing surface thereof projecting through corresponding apertures 19 in the rim. The shoes are preferably in the shape of an I lying flat. From the center of the stem of the I a rod 20 rises which projects through a block 21 disposed transversely of the wheel and anchored to the spokes 10 of the same. The block constitutes a guide for the rod and an abutment for a coil spring 22 provided on the end of the rod 20 extending from the block toward the cam. A suitable collar 23 is provided on the rod for engaging the other end of the spring and whereby the tendency of the spring is to raise the shoe from the rim.

The cam 12 has as many bosses 24 as there are shoes on the wheel to engage the corresponding rods 20. To bring the bosses into engagement with the rods the brake is applied to the bevel gear 15 while the wheel is rotated on the axle. In consequence rotation is imparted to the bevel gear 13 through the pinion 14. This displacement of the cam moves the rods 20 outwardly and forces the studs 18 through the rim. As soon as the bosses have alined with the rods the brake mechanism 16 is released and, therefore, the motion of the cam 12 arrested. While the bosses 24 are alining with the rods 20, the studs 18 remain outside of the rim 11 and, therefore, increase the traction of the wheel.

To retract the shoes from the wheel, the brake is applied to force the bosses of the cam out of alinement with the rods 20, whereby the ends of the rods are retracted by the springs 22 into the depressions of the cam which are formed between the bosses. This action of the springs forces the shoes away from the rim.

To facilitate the penetration of the studs 18 through the apertures of the rim, the ends of the same are diamond shape. To prevent mud from interfering with the shoes, the wearing surface of the shoes is provided with knife edges which will tend to break up any mud that may accumulate on the inner face of the rim.

In cases where additional traction is desired, the shoes 17' may be provided with side extensions 25, either integral therewith or bolted thereto as shown in Figs. 5 and 6. These flange extensions 25 extend outside of the edges of the rim and thereat present outwardly depressed flanges 26 which are equivalent to the studs 18' which pass through the rim of the wheel. It is self-evident that those extensions participate in all the movements of the shoes 17'.

I claim:

1. A traction wheel comprising a hub, a rim, shoes at the rim having means adapted to project through the rim, means tending normally to move the shoes toward the hub, a cam mounted revolubly on the hub, meshing gears associated with the cam, and means for frictionally engaging one of the gears whereby said cam is caused to rotate and move said shoes toward the rim whereby the means on the shoes project out of the rim.

2. A traction wheel comprising,—a hub, a rim, shoes at the rim having means adapted to project through the rim, yielding means normally tending to move the shoes from the rim toward the hub, a cam revolubly mounted on the hub and adapted to engage the shoes and secure them against the resistance of the yielding means, whereby the means on the shoes are caused to project through the rim, meshing gears coupled to the cam, and means for offering resistance to the rotation of one of the gears, whereby the cam is actuated.

3. A traction wheel comprising,—a hub, a rim, shoes at the rim having means adapted to project through the rim, means normally tending to move the shoes toward the hub, a cam revolubly mounted on the hub for actuating the shoes, a gear constrained to revolve with the cam, a pinion meshing with said gear, a second gear meshing with said pinion, and a brake mechanism associated with said second gear whereby motion may be imparted to the cam on the hub.

4. A traction wheel comprising,—a hub having flanges at the ends thereof, a rim, spokes securing the flanges of the hub to the rim, shoes at the rim having means adapted to project through the rim, a rod associated with each of the shoes and rising toward the hub, a guide for each of said rods secured to the spokes, a spring associated with the rod and guide normally tending to move the rod toward the hub, a cam revoluble on the hub and adapted to engage the rods and move the same against the resistance of the springs, a gear constrained to revolve with the cam, a pinion revoluble in one of the flanges of the hub and in mesh with the gear, a second gear in mesh with the pinion, and a brake for preventing the rotation of said second gear whereby rotary motion may be imparted to said cam when the wheel is rotated.

5. A traction wheel comprising,—a hub, a rim, shoes at the rim having means adapted to project through the rim, means normally tending to move the shoes from the rim toward the hub, a cam revolubly mounted on the hub for moving the shoes toward the rim whereby the means associated with the shoes are caused to project through the rim, a gear constrained to revolve with the cam, a pinion in mesh with the gear constrained to revolve with the hub of the wheel, a second gear in mesh with the pinion, and a brake associated with the second gear whereby the motion of same may be prevented and thereby a rotary motion may be imparted to the cam on the hub when the wheel is rotated.

DAVID ALDON WALLACE.